Oct. 21, 1958 W. S. PRAEG ET AL 2,856,824
COUNTER BALANCING MECHANISM FOR GEAR FINISHING MACHINES
Original Filed March 24, 1948 2 Sheets-Sheet 1

INVENTOR.
WALTER S. PRAEG
BY ARTHUR B. BASSOFF

THEIR ATTORNEY

Oct. 21, 1958   W. S. PRAEG ET AL   2,856,824
COUNTER BALANCING MECHANISM FOR GEAR FINISHING MACHINES
Original Filed March 24, 1948   2 Sheets-Sheet 2

INVENTOR.
WALTER S. PRAEG
ARTHUR B. BASSOFF
BY
THEIR ATTORNEY

United States Patent Office 2,856,824
Patented Oct. 21, 1958

2,856,824

COUNTER BALANCING MECHANISM FOR GEAR FINISHING MACHINES

Walter S. Praeg and Arthur B. Bassoff, Detroit, Mich., assignors, by mesne assignments, to The Fellows Gear Shaper Company, Springfield, Vt., a corporation of Vermont Original application March 24, 1948, Serial No. 16,636, now Patent No. 2,669,906, dated February 23, 1954. Divided and this application June 25, 1953, Serial No. 377,005

5 Claims. (Cl. 90—7)

The present invention relates to a gear shaping machine.

It is an object of the present invention to provide a gear shaper in which vibration is substantially reduced and production tolerances are closely maintained.

A further object is to provide for dynamic counterbalancing of the cutter spindle.

Figure 1:
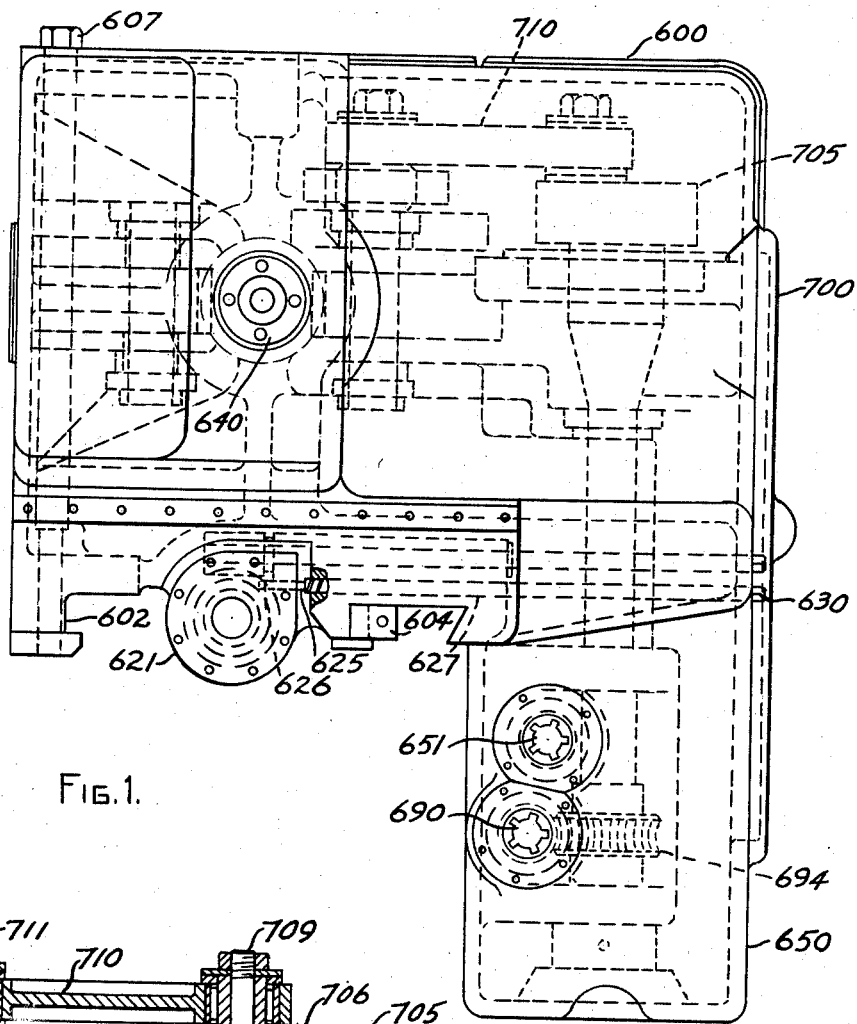
Figure 3:
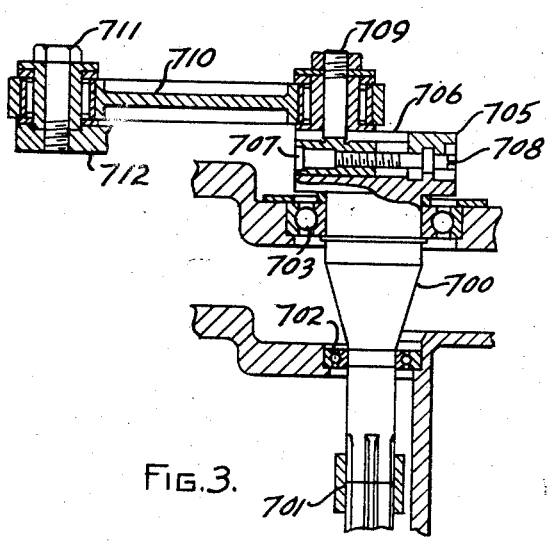
Figure 2:
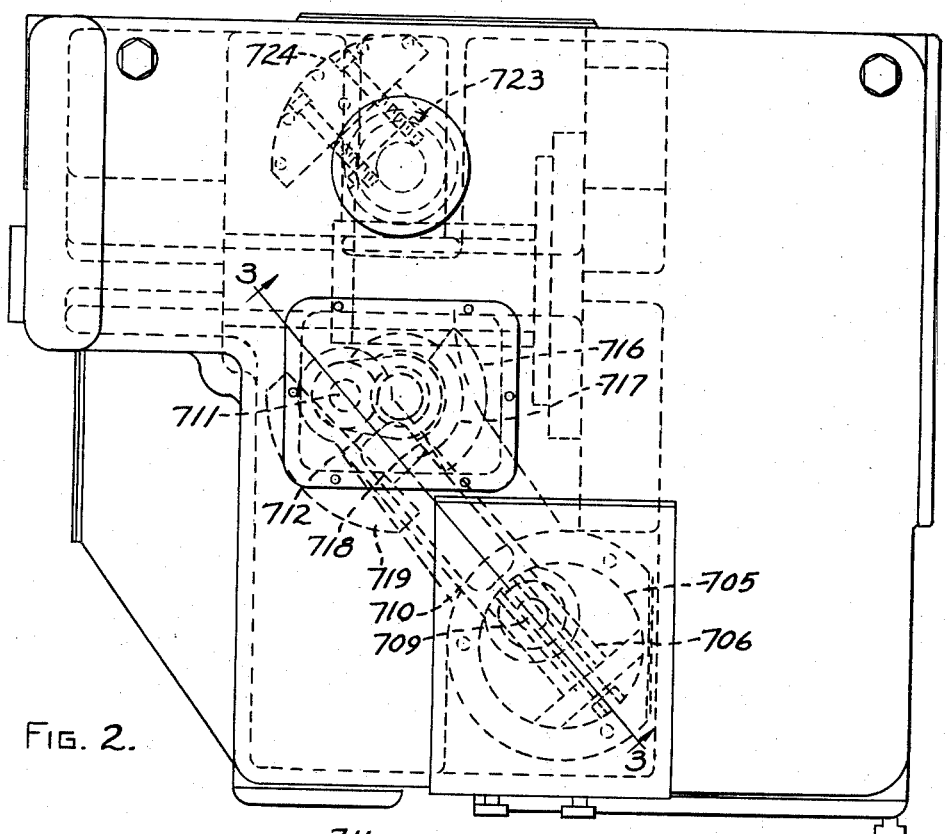
Figure 4:
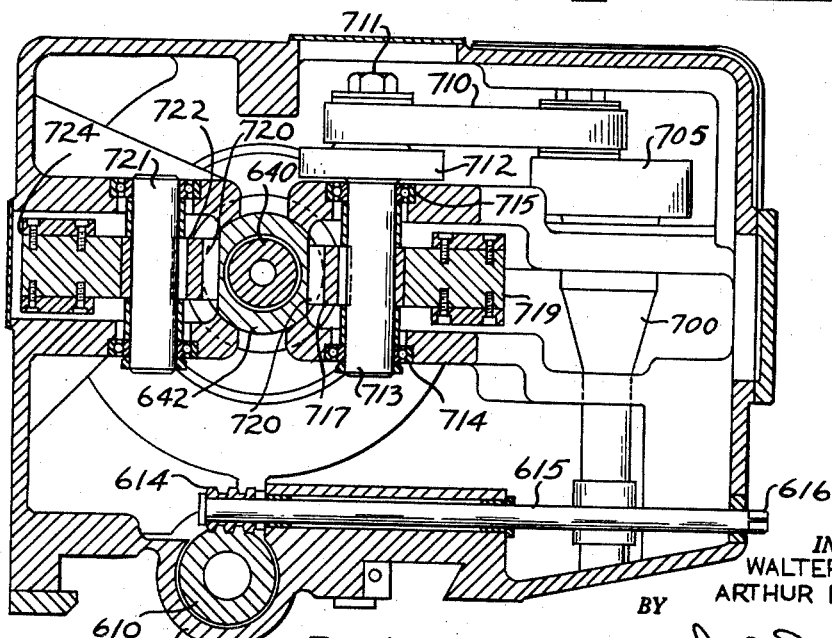

Other objects not enumerated above will become apparent as the description proceeds, in conjunction with the drawings, in which:

Figure 1 is a left side elevation of the cutter head;
Figure 2 is a plan view of the cutter head;
Figure 3 is a section on the line 3—3, Figure 24;
Figure 4 is a cut away section of the cutter head showing the counter balancing mechanism.

The means for imparting reciprocation to the cutter spindle 640 includes dynamic balancing means which render the machine substantially vibrationless in use and contribute to the speed and accuracy with which the gears may be cut.

The machine is designed primarily to be used with a flexible gear shaper cutter of the type disclosed in prior application, Serial No. 683,650, now Patent Number 2,604,016, of Walter S. Praeg, which is assigned to the assignee herein. Inasmuch as this cutter is effective to provide clearance in back of the cutting edge by flexing of the cutter and since it therefore may operate to cut in both directions, the present machine is very substantially simplified over prior known gear shapers. It has been customary in the past to employ shaper cutters which are relieved in back of the cutting edge and which therefore are adapted to cut in only one direction. The conventional shaper cutter cycle therefore includes a cutting stroke, relieving movement, an idle return stroke; and a recovering movement corresponding to the relieving movement which completes the cycle and conditions the apparatus for a second cutting stroke. The present machine on the contrary has only two movements corresponding to the foregoing. These are a forward and return cutting stroke. In both cases of course index rotation or rotary feed is imparted to the gear and cutter. It will therefore be seen that the present apparatus is adapted to operate to remove metal at a substantially higher rate than has previously been possible, and furthermore due to the several refinements of the machine it operates quietly and will produce gears to a high degree of accuracy.

Contributing to the rigidity of the machine in operation and the accuracy of the gears produced thereby is the dynamic balancing mechanism for the cutter spindle previously referred to.

Referring now to Figure 4, a cutter spindle 640 is mounted in the cutter head for axial reciprocation and for rotary feed. The cutter spindle has a reduced portion, on which reduced portion is mounted a sleeve 642 in which the spindle 640 is relatively rotatable.

Independent mechanism is provided for effecting the cutting reciprocation of the spindle and the timed rotary feed thereof.

Mechanism is provided for effecting relatively rapid cutting reciprocation of the cutter spindle 640 and this includes means for effecting dynamic balance of the moving parts, as will now be described.

The shaft 700 is supported by bearings 702 and 703, bearing 703 being designed to withstand substantial radial forces imparted by converting rotary motion of the shaft 700 to reciprocatory motion of the cutter spindle 640. At its upper end the shaft 700 is provided with an adjustable crank member 705 provided with a radially extending slot 706 in which is mounted a crank pin supporting block 707, the block being longitudinally adjustable in the slot by threaded adjusting means including the headed adjusting screw 708. By manipulation of the screw 708 the effective throw of the crank 705 is varied. The block 707 carries an upwardly extending crank pin 709 to which is connected one end of a link 710, the other end of the link embracing a sleeved crank pin 711 carried by a crank 712 (Figures 2 and 4). The crank 712 is keyed or otherwise secured to a short shaft 713 mounted between bearings 714 and 715 in the cutter head. The crank 712 as best seen in Figure 2, is provided with a radially extending counterbalance portion 716 diametrically oppositely disposed from the pin 711 with respect to the axis of the supporting shaft 713.

Keyed or otherwise secured to the shaft 713 in line with the axis of the cutter spindle 640 is a segmental pinion 717, one side of the pinion being provided with stepped flat surfaces as indicated at 718 and to the flat surface of this segmental pinion is bolted or otherwise secured a counterbalance weight 719.

Diametrically opposite sides of the sleeve 642 are provided with rack teeth as indicated at 720 for meshed engagement with the teeth formed segmentally on the pinion 717. At the opposite side of the sleeve 642 is mounted a substantially identical mechanism including a shaft 721 to which is keyed or otherwise secured a segmental pinion 722 having a stepped flat side as indicated at 723. A counterbalance 724 identical with the counterbalance 719 previously described is bolted or otherwise secured to the pinion 722.

The radius of rotation of the crank pin 709 is in all cases less than the radius of rotation of the crank pin 711 and accordingly rotation of the shaft 700 will result in back and forth oscillation of the shaft 713. Oscillation of the shaft 713 produces through the coaction of the teeth of the pinion 717 and the rack teeth 720 a corresponding reciprocation of the cutter spindle 640. Reciprocation of the cutter spindle 640 through the coaction of the rack teeth 720 at the opposite side of the sleeve 642 with the teeth of the pinion 722 results in a corresponding back and forth oscillation of the pinion 722 and the counterbalance 724 about the axis of the shaft 721. This arrangement is calculated to provide for diametric balance in the operation of the machine and thereby to avoid vibration, heavy stresses on reversal of the cutter spindle, and the like. As the cutter spindle 640 moves outwardly, counterbalances 719 and 724 rotate about the axes of the shafts 713 and 721 respectively, the direction of motion of the counterbalances being mainly opposed to the direction of motion of the cutter spindle. Inasmuch as the means for converting rotary motion of the shaft 700 to back and forth reciprocatory motion of the spindle 640 includes a crank, it will be understood that the velocity of reciprocation is a maximum at the middle of the stroke and falls off at either end of the stroke so that sudden changes of direction of the spindle do not occur. Furthermore, at all times that a substantial mass is moving in one direction, such for example as the movement of the spindle, this motion is effectively dynamically counterbalanced by a substantial opposite movement of a dynamically equally effective mass in the opposite direction.

What we claim as our invention is:

1. In a gear shaping machine, a reciprocable cutter spindle, a sleeve guide for said spindle, a driving sleeve rotatably mounted on said spindle, said driving sleeve having rack teeth at opposite sides thereof, spindle counterbalance means comprising pinions in mesh with said rack teeth and counterweights oscillatable about fixed axes by said pinions, and crank means for driving one of said pinions in back-and-forth oscillation to reciprocate said spindle.

2. In a gear shaping machine, a reciprocable spindle, a rack member fixed to said spindle for reciprocation therewith with rack teeth at opposite sides thereof, pinions mounted adjacent to said rack member and having teeth thereon in mesh with said rack teeth, and spindle counterbalancing weights carried by said pinions.

3. In a gear shaping machine, a reciprocable spindle, a rack member with rack teeth at opposite sides thereof for reciprocating said spindle, pinions in mesh with said rack teeth, spindle counterbalancing weights carried by said pinions, and means for oscillating one of said pinions to reciprocate said rack, said other pinion being oscillated by reciprocation of said rack.

4. In a gear finishing machine a reciprocating spindle of substantial mass, means for reciprocating said spindle at substantial speeds, balancing means for effecting dynamic counterbalancing of said spindle and for substantially eliminating vibration due to said reciprocation of said spindle, said balancing means comprising a plurality of weights, means rigidly connecting said weights to said spindle for effecting movement of said weights in a direction generally opposite to the direction of movement of said spindle, said weights being proportioned to the mass of said spindle so as to effectively dynamically balance said spindle.

5. In a gear finishing machine a reciprocating spindle of substantial mass, means for reciprocating said spindle at substantial speeds, balancing means for effecting dynamic counterbalancing of said spindle and for substantially eliminating vibration due to said reciprocation of said spindle, said balancing means comprising a plurality of weights, means rigidly connecting said weights to said spindle for effecting movement of said weights in paths symmetrically located with respect to the neutral axis of said spindle in the direction of its reciprocation, and in a direction generally opposite to the direction of movement of said spindle.

References Cited in the file of this patent

UNITED STATES PATENTS

| | | |
|---|---|---|
| 868,159 | Coventry | Oct. 15, 1907 |
| 939,063 | Myrholm | Nov. 2, 1909 |
| 1,438,405 | Shaw et al. | Dec. 12, 1922 |
| 1,440,512 | Wais | Jan. 2, 1923 |
| 1,577,975 | Klausmeyer | Mar. 23, 1926 |
| 1,688,484 | Carter | Oct. 23, 1928 |
| 1,835,680 | Varcin | Dec. 8, 1931 |
| 2,145,355 | Jereczek | Jan. 31, 1939 |
| 2,155,680 | Pfauter | Apr. 25, 1939 |
| 2,294,094 | O'Leary | Aug. 25, 1942 |